July 9, 1963

R. S. JOHNSON 3,097,074

CATALYTIC CONVERTER

Filed Nov. 7, 1960

2 Sheets-Sheet 1

INVENTOR.
Ralph S. Johnson
BY
L. P. Barnard
ATTORNEY

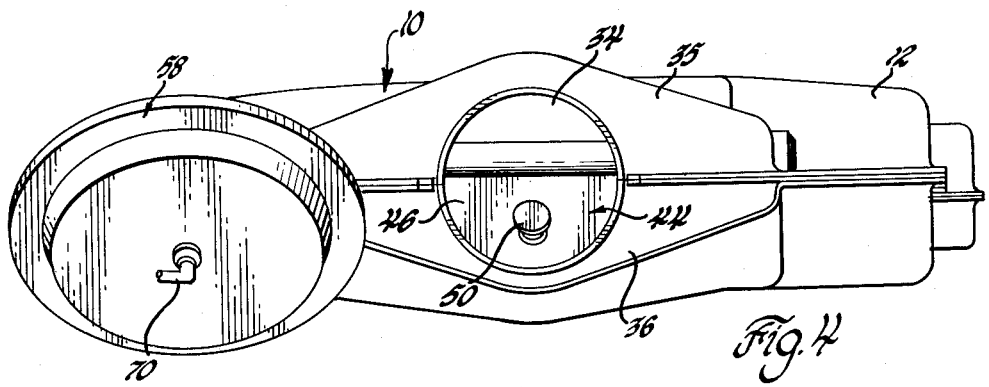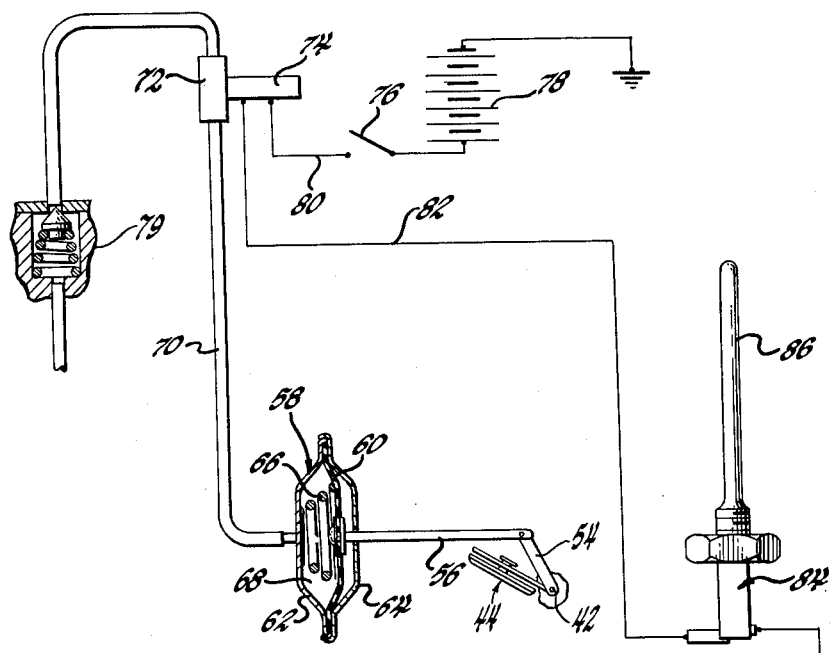

United States Patent Office 3,097,074
Patented July 9, 1963

3,097,074
CATALYTIC CONVERTER
Ralph S. Johnson, Rochester, Mich., assignor to General Motors Corporation, Detroit, Mich., a corporation of Delaware
Filed Nov. 7, 1960, Ser. No. 67,569
1 Claim. (Cl. 23—288)

The present invention relates to a catalytic converter apparatus of the type in which exhaust gas from an internal combustion engine is adapted to be mixed with air and passed through a catalyst bed whereby the unburned hydrocarbons are converted to compounds of a less toxic nature. More specifically, the present invention is an improvement in the catalytic converter apparatus shown and described in co-pending application Serial No. 49,256, filed August 12, 1956, Johnson.

In utilizing a catalytic type converter, the temperatures in the catalyst bed may vary over a very short period of time from below zero to 1,200° F. It is possible that during abnormal driving conditions or in the event of some other unforeseen contingencies such as a fouled spark plug, excessive temperatures can obtain within the converter that would be of a destructive nature. To avoid this eventuality, the present invention provides means for by-passing the exhaust gases around the converter bed in the event of excessive temperatures in the catalytic converter.

More specifically, the present invention includes a valve arrangement whereby under normal operating conditions, the exhaust gases are passed through the upper portion of the converter whereby they will subsequently flow through the catalyst bed or which gases, under abnormal temperature conditions, may be diverted to the lower portion of the converter by-passing the catalyst bed.

The details as well as other objects and advantages of the present invention will be apparent from a perusal of the detailed description which follows.

Figure 1:
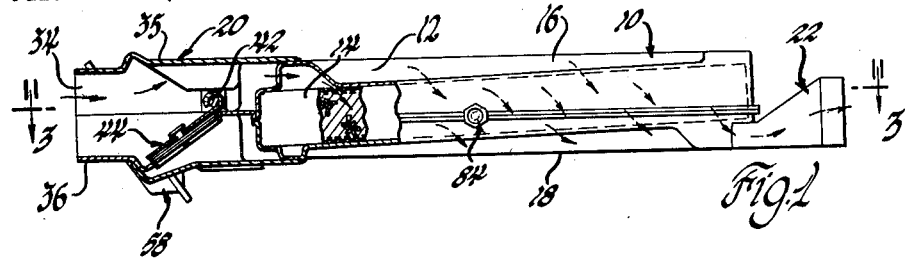
Figure 2:
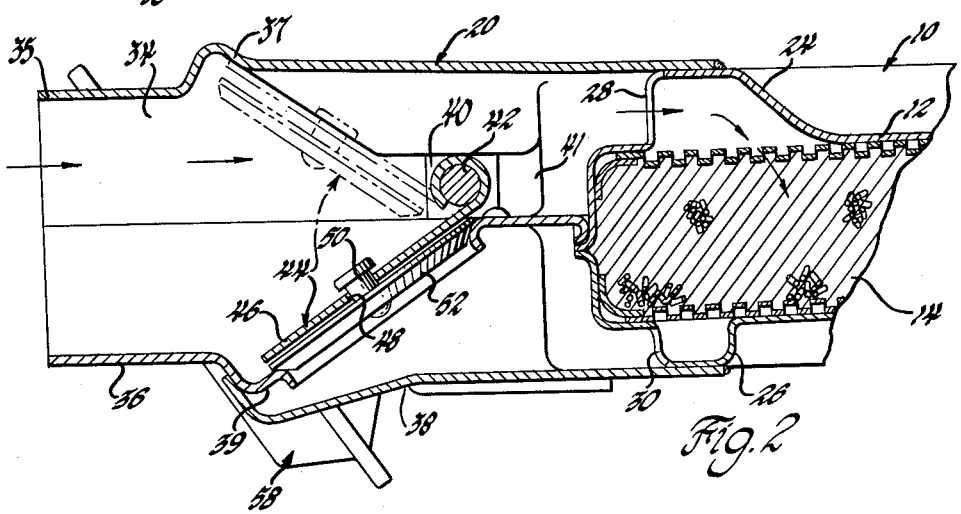
Figure 3:
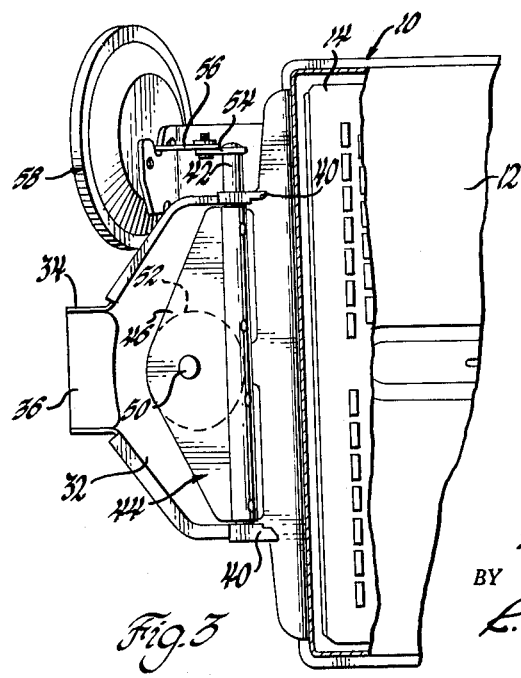

In the drawings:
FIG. 1 illustrates a catalytic converter embodying the subject invention;
FIG. 2 is an enlarged view of the inlet end of the converter;
FIG. 3 is a partial plan section of the exhaust control valve;
FIG. 4 is an end view of the converter inlet;
FIG. 5 is a circuit for controlling the exhaust gas by-pass valve.

The details of the converter, per se, are shown and described in the aforementioned copending Johnson application. For present purposes, a converter is shown generally at 10 and includes casing means 12 within which a catalyst bed 14 is canted or inclined in relation to the longitudinal axis of the converter casing. The inclined nature of catalyst bed 14 results in a tapered inlet passage 16 formed between the bed and the casing and in oppositely tapered outlet passage 18.

Inlet and outlet members 20 and 22 are suitably secured to casing means 12. Casing means 12 includes raised portions 24 and 26 formed on the upper and lower surfaces thereof adjacent the inlet end of the casing. Inlet member 20 is actually secured to raised casing portions 24 and 26. Portions 24 and 26 include openings 28 and 30 extending substantially throughout the width of casing means 12 whereby exhaust gas and air entering inlet member 20 may flow either above or below catalyst bed 14.

Inlet member 20 includes a flared portion 32 which is secured at it widest end directly to casing means 12 and terminates at its other end in a cylindrical portion 34, to which an engine exhaust pipe is adapted to connect.

Inlet member 20 is fabricated of first, second, and third casing portions 35, 36 and 38. Portion 35 is directly mounted to casing 12 and is offset to provide a valve seat 37. Casing portion 36 extends partially within and is peripherally attached to casing portion 35. A valve seat 39 is formed in casing portion 36.

Casing portion 38 is a cover attached to portion 36 and serves to confine the exhaust gas as it flows between valve seat 39 and opening 30. A suitable bearing member 40 is mounted on wall 41 and in turn rotatably supports a shaft member 42 on which a valve member 44 is fixed for rotation therewith. Valve member 44 is adapted, to be rotated, by means to be subsequently described, to seat against either seat 37 or 39 and thereby to direct the exhaust gases either above or below the catalyst bed 14.

The construction of valve member 44 may best be seen by referring to FIGS. 2 and 3. Valve member 44 includes a triangularly shaped base member 46 fixed to shaft 42. Triangular shaped member 46 includes a centrally disposed hole 48 adapted to receive a stud member 50 to which a valve seating member 52 is secured. Stud member 50 is loosely disposed within hole 48 whereby valve seating member 52 is able to center itself with respect to valve seat 39. By utilizing the self-centering valve seating member 52, valve 44 will completely shut off by-pass exhaust gas flow beneath catalyst bed 14 when the valve is in the position shown in the drawings.

When valve 44 is rotated to the dotted position shown in FIG. 2, exhaust gas will be by-passed beneath catalyst bed 14 to prevent overheating thereof during abnormal operating conditions, supra. In its by-pass position, it is unnecessary that valve 44 seat tightly against seat 37 for which reason it will suffice to have the triangular shaped member 46 coact directly with the seat.

The means for controlling the actuation of by-pass valve 44 will now be considered. The system for controlling the actuation of the by-pass valve is shown diagrammatically in FIG. 5. A lever 54 is fixed to shaft 42 and is suitably articulated through a link 56 to a diaphragm device 58. Diaphragm device 58 includes a flexible diaphragm member 60 peripherally clamped between casing members 62 and 64. Link 56 is centrally secured to diaphragm 60. A spring member 66 is disposed within casing 62 and biases diaphragm 60 to the right whereby valve 44 is moved against seat 37 to a position blocking flow through catalyst bed 14.

Chamber 68 defined by casing 62 and diaphragm 60 is communicated through a conduit 70 and a valve 72 to a source of manifold vacuum. Check valve 79 is provided to maintain vacuum even while the engine is operated at full throttle. Valve 72 is controlled by a solenoid 74 which when energized communicates diaphragm device 58 with manifold vacuum and when de-energized communicates chamber 68 to atmosphere. Solenoid 74 is connected to ignition switch 76 and a power source such as battery 78 through a lead 80. A second lead 82 connects solenoid 74 with a temperature responsive switch 84. Temperature responsive switch 84 includes a probe member 86 adapted to project within catalyst bed 14.

With the engine operating, ignition switch 76 closed, and further with catalyst bed 14 operating at or below normal temperatures, temperature responsive switch 84 will be closed whereby solenoid 74 will be energized causing valve 72 to communicate diaphragm chamber 68 to the source of manifold vacuum. Under these conditions valve 44 is seated against seat 39 whereby exhaust gas will flow through catalyst bed 14. When, however, the catalyst bed temperature exceeds a predetermined value, temperature responsive switch 84 will be opened de-energizing solenoid 74 permitting valve 72 to admit atmospheric pressure to chamber 68 whereby spring 66 will rotate valve 44 to its upper position thereby bypassing exhaust gas beneath catalyst bed 14. In this way the temperature of catalyst bed 14 will not exceed a predetermined value.

I claim:

A catalytic converter apparatus comprising a casing having first and second inlet openings in one end thereof and an outlet opening formed in the opposite end thereof, a catalyst bed disposed within said casing and dividing the latter into vertically-spaced first and second gas flow chambers above and below the bed, the first inlet opening communicating with said first chamber for directing gas flow in series through the second chamber and the catalyst bed to the outlet opening, the second inlet opening disposed adjacent the second chamber for directing gas through the second chamber to the outlet opening without passing through the first chamber and the catalyst bed, an inlet casing member secured to the casing means and enclosing said first and second inlet openings, first and second valve seats formed in the inlet casing and respectively disposed in series with the first and second inlet openings, a valve pivotally supported by the inlet casing member at a point between said valve seats and adapted to coact with the latter to block flow therethrough, said valve including a self-centering valve member for cooperation with the second valve seat so as to assure positive closing thereof, a pressure source, fluid operated means operatively associated with said valve for moving the latter for engagement with the first and second valve seats, first means controlling communication of the pressure source with said fluid operated means, temperature-responsive means located in the catalyst bed for sensing the temperature thereof, and second means connecting said temperature responsive means to the first means for causing activation of the latter so as to connect the pressure source with the fluid operated means whereby the latter moves said valve to engage the first valve seat whenever the temperature of the catalyst bed reaches a predetermined destructive temperature.

References Cited in the file of this patent

UNITED STATES PATENTS

| | | |
|---|---|---|
| 2,747,976 | Houdry | May 29, 1956 |
| 2,776,875 | Houdry | Jan. 8, 1957 |
| 2,898,202 | Houdry et al. | Aug. 4, 1959 |
| 2,946,651 | Houdry et al. | July 26, 1960 |
| 2,991,160 | Claussen | July 4, 1961 |